(12) United States Patent
Abraham et al.

(10) Patent No.: US 10,157,046 B2
(45) Date of Patent: Dec. 18, 2018

(54) METHOD AND APPARATUS FOR GENERATING AN EXPLORER FOR USER INTERFACE PROTOTYPING

(71) Applicant: Infragistics, Inc., Cranbury, NJ (US)

(72) Inventors: Sunil George Abraham, Langhorne, PA (US); J. Ambrose Little, Trenton, NJ (US); Santiago Aguiar, Montevideo (UY); Nicolas Castagnet, Montevideo (UY); Diego Rivero, Montevideo (UY); Martin Silva, Montevideo (UY)

(73) Assignee: Infragistics, Inc., Cranbury, NJ (US)

( * ) Notice: Subject to any disclaimer, the term of this patent is extended or adjusted under 35 U.S.C. 154(b) by 470 days.

(21) Appl. No.: 14/089,147

(22) Filed: Nov. 25, 2013

(65) Prior Publication Data

US 2015/0149966 A1    May 28, 2015

(51) Int. Cl.
*G06F 17/22* (2006.01)
*H04L 12/24* (2006.01)
*G06F 3/0484* (2013.01)
*G06F 8/38* (2018.01)

(52) U.S. Cl.
CPC ............. *G06F 8/38* (2013.01); *G06F 3/0484* (2013.01); *G06F 17/2247* (2013.01); *H04L 41/22* (2013.01)

(58) Field of Classification Search
CPC ..... G06F 3/0484; G06F 17/2247; H04L 41/22
See application file for complete search history.

(56) References Cited

U.S. PATENT DOCUMENTS

| 5,651,108 | A  | * | 7/1997  | Cain .......................... G06F 8/34 715/763 |
| 5,786,816 | A  | * | 7/1998  | MacRae ................ G06F 19/325 128/920 |
| 6,055,369 | A  | * | 4/2000  | Sawahata ................... G06F 8/34 717/109 |
| 6,330,007 | B1 | * | 12/2001 | Isreal ..................... G06F 3/0481 715/207 |
| 7,086,007 | B1 | * | 8/2006  | Bushey .............. G06Q 20/1085 705/43 |
| 7,594,181 | B2 |   | 9/2009  | Rothwein et al. |
| 2004/0001092 | A1 | * | 1/2004 | Rothwein ................. G06F 8/38 715/763 |
| 2007/0149036 | A1 |   | 6/2007 | Misovski |
| 2009/0293005 | A1 |   | 11/2009 | Hooyman |

(Continued)

FOREIGN PATENT DOCUMENTS

EP    1959336 A1    8/2008

OTHER PUBLICATIONS

Andrew Trice, "My Workflow for Developing PhoneGap Applications", Jan. 18, 2013, TriceDesigns, accessed from Internet on Sep. 16, 2015, accessed from <http://www.tricedesigns.com/2013/01/18/my-workflow-for-developing-phonegap-applicati>, pp. 1-14.*

(Continued)

*Primary Examiner* — Nicholas Klicos
(74) *Attorney, Agent, or Firm* — Moser Taboada (57) ABSTRACT

A method for generating an interactions explorer for a user interface prototype comprising detecting one or more prototyping actions while a user creates a user interface prototype, adding the one or more prototyping actions to an interaction hierarchy and generating an interactive visual depiction of the interaction hierarchy.

3 Claims, 8 Drawing Sheets

(56) References Cited

U.S. PATENT DOCUMENTS

| | | | |
|---|---|---|---|
| 2010/0050152 A1 | 2/2010 | Gilboa | |
| 2010/0088618 A1 | 4/2010 | Mayer-Ullmann | |
| 2012/0054590 A1* | 3/2012 | Oh .................. | G06F 17/246 715/212 |
| 2012/0221998 A1* | 8/2012 | Rowley ............. | G06F 9/4443 717/105 |
| 2012/0290959 A1* | 11/2012 | Quine ............... | G06F 8/34 715/765 |
| 2013/0159892 A1* | 6/2013 | Suraj ................ | G06F 3/048 715/762 |
| 2013/0219263 A1* | 8/2013 | Abrahami .......... | G06F 17/211 715/234 |
| 2015/0148138 A1* | 5/2015 | Rabin ................ | A63F 13/60 463/43 |

OTHER PUBLICATIONS

Faithe Wempen, "Microsoft PowerPoint 2010 Bible", 2010, Wiley Publishing, Inc., 116 pages.* jake8bit, How to make UI clickthroughs using PowerPoint, Jan. 3, 2010, accessed on Jul. 24, 2016, accessed from <https://www.youtube.com/watch?v=D5r11sM7OoY>, 0:00-1:42.*

International Search Report and Written Opinion dated Feb. 27, 2015 for PCT Application No. PCT/US2014/065451.

* cited by examiner

METHOD AND APPARATUS FOR GENERATING AN EXPLORER FOR USER INTERFACE PROTOTYPING

BACKGROUND OF THE INVENTION

Field of the Invention

Embodiments of the present invention generally relate to user interface prototyping, and, more specifically, to a method and apparatus for generating an interaction explorer for a user interface prototype.

Description of the Related Art

Developing and designing user interfaces for software applications requires extensive design knowledge and intimate contact with the underlying development technologies associated with the software framework of the user interface. However, designers are often not developers and may be unfamiliar with the technological aspect, but have a strong understanding of coherent design principles for user interfaces. In some instances it may be desirable for a designer to rapidly prototype an application (web application, mobile application, desktop application or the like) without worrying about particular technological implementation details. Designers can then show off a prototype user interface for an application without doing any programming. However, when creating the user interface prototype, the designer may realize that various designs must be repeated in several branches of user actions, or flows, through the interface, leading to designer frustration, irritation and wasted time. Further, a designer often does not have an accurate overview for the user interface screens and flows that he or she has created over time, making it difficult to design an effective user interface.

Therefore, there is a need for a method and apparatus for generating an interaction explorer for a user interface prototype in accordance with exemplary embodiments of the present invention.

SUMMARY OF THE INVENTION

A method for generating an interactions explorer for a user interface prototype comprising detecting one or more prototyping actions while a user creates a user interface prototype, adding the one or more prototyping actions to an interaction hierarchy and generating an interactive visual depiction of the interaction hierarchy.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method and apparatus for generating an explorer for user interface prototyping. Software applications often have extensive functional user interfaces, which may be initially designed via a prototyping tool as described in the present invention. According to one embodiment, a user creates portions of the graphical user interface, termed "screens". Each screen may be a collection of buttons, list items, graphical images, video streams, or the like. As the user adds each object, along with interactions between objects in the screen and new screens, objects, etc. an interactions explorer processor generates an interaction explorer at the execution of each action to display an accurate timeline and overview of the prototype. A user can easily navigate through each branch of the prototype to determine how a user may use the application, which application flows are most often users, where a flow represents a sequence from one screen to another screen, and how the user experience feels, without implementing the programming behind each interaction.

Figure 1:
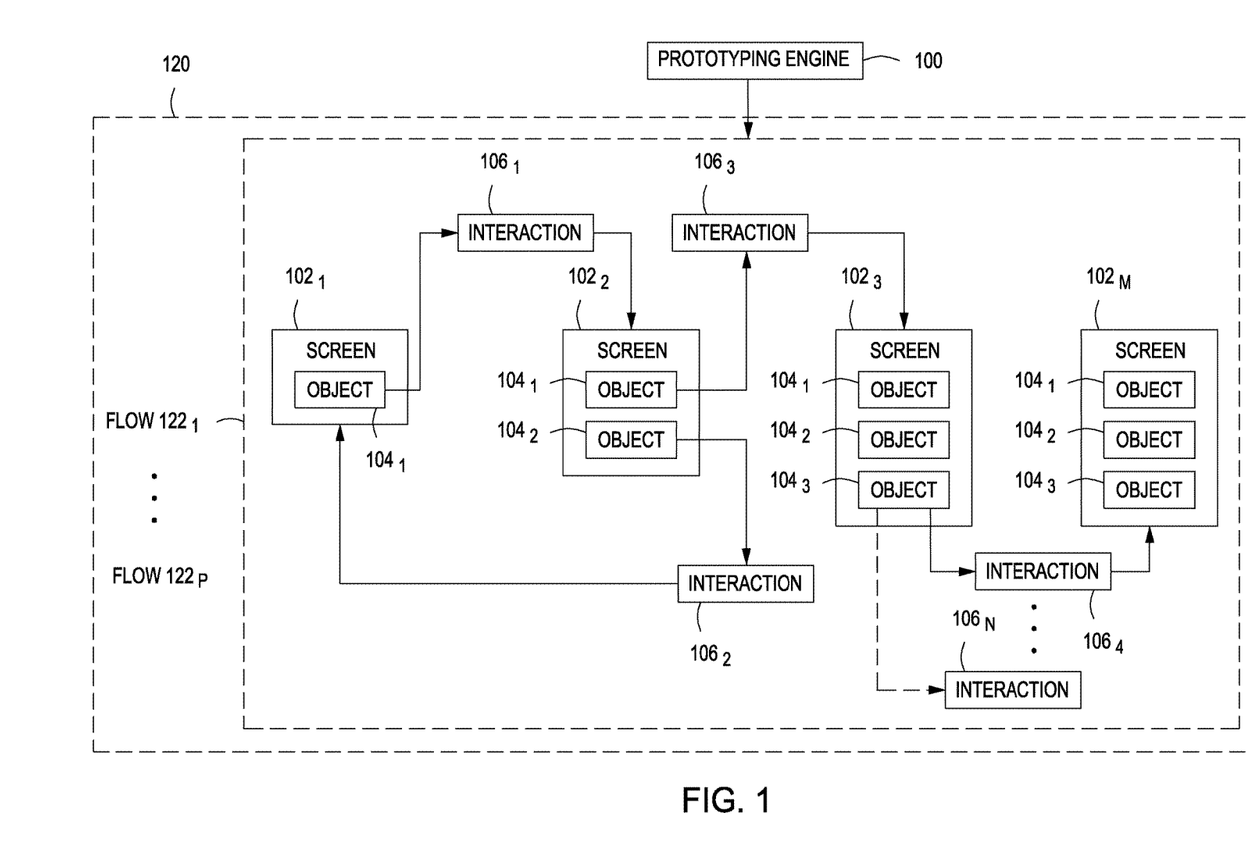
FIG. 1 is a block diagram of user interface prototype in accordance with exemplary embodiments of the present invention.

FIG. 1 is a block diagram of user interface prototype 120 in accordance with exemplary embodiments of the present invention. A prototyping engine 100 is used in generating the user interface prototype 120. The prototyping engine 100 may be a portion of software executing on a notebook computer, a tablet computer, a desktop computer or the like. Those of ordinary skill in the art will recognize that the prototyping engine 100 is not limited to the underlying computing device the engine 100 is executing on.

The prototyping engine 100 is used by a designer, generally, to design a user interface (UI) prototype 120. The user interface prototype 120 may be a "rough draft" of what a software application will eventually resemble, in terms of screen layout and user interactions. The software application may be a mobile/tablet application ("App"), a desktop software application, or the like; the present invention does not limit the software application to a particular type. A flow represents the way a user would use an application in various circumstances, as they navigate menus, options or the like. A UI prototype may comprise one or more flows, where each flow comprises various screens and interactions for navigating through the screens and represent branches in the UI prototype 120. The UI prototype 120 comprises, for example, one or more flows, flow $122_1$ to flow $122_P$.

According to the shown example, flow $122_1$ comprises multiple screens—screen $102_1$ to $122_M$. Some screens may be linked to other screens, while some screens may only be linked to one other screen. Screen $102_1$ comprises a series of objects $104_1$, such as text boxes, graphical images, lists, radio buttons, menus, buttons, and the like, though those of ordinary skill in the art will recognize that any type of objects may be placed in the screen. Screen $102_2$ comprises object $104_1$ and object $104_2$. Screen $102_3$ comprises object $104_1$, object $104_2$ and object $104_3$. A theoretical screen $102_M$ may comprise object $104_1$, object $104_2$ $_{and}$ object $104_3$. According to exemplary embodiments, the UI prototype 120 may be have as many screens as required by the designer, or allowed by the underlying memory of the computing device, though those of ordinary skill in the art will recognize that off-device memory solutions may allow for a greater number of screens.

Note that in designing the UI prototype 120, a designer creates the screens sequentially, or links them sequentially. For example, a user may create screen $102_1$ initially, and then link screen $102_1$ to new screen $102_2$ via an interaction $106_1$. Interactions are discussed further below. Once new screen $102_2$ is created, the new screen $102_2$ inherits all objects (i.e., the objects are propagated to each screen linked via an interaction to the current screen being edited) and their interactions from screen $102_1$, such as object $104_1$. However, the designer may determine that another object is required in screen $102_2$, namely, object $104_2$. This object $104_2$ will now appear on all screens which are reachable via an interaction from screen $102_2$. The designer creates an interaction $106_2$ associated with object $104_1$, which transitions the UI prototype 120 to screen $102_3$. Screen $102_3$ inherits object $104_1$ and $104_2$ from screen $102_2$, but the designer adds an optional object $104_3$ to screen $102_3$. Object $104_3$ is not added to the previous screens, but will be present in any subsequent screens that are the result of an interaction associated with an object in screen $102_3$. In the shown example, object $104_3$ is associated with an interaction $106_4$, which transitions the UI prototype to theoretical screen $102_M$, which contains all of the previously created objects $104_1$-$104_3$. According to an exemplary embodiment, a designer has the option to remove, for example, object 1041 from screen $102_2$ without affecting any later screens such as screens $102_3$ to $102_M$. Alternatively, the prototyping engine 100 may be configured to propagate such a change throughout each screen which is a result of an interaction on screen $102_2$ namely, screens $102_3$ to $102_M$.

According to exemplary embodiments of the present invention, prototype interactions operate on screens and screen objects. Generally, an interaction may be any number of predefined actions a user may take on an object, user to manipulate an object, or the like. An interaction may also be an action that is executed on the screen after a designed defined period of time such as a transition, animation, or the like. In exemplary embodiments, the interaction represents a behavior and a response to that behavior. In FIG. 1, interaction $106_1$ operates an object $104_1$.

For example, if object $104_1$ is a button, the interaction $106_1$ may represent, in exemplary embodiments, what happens when a user clicks on the button, or hovers over the button. In this particular instance, interaction $106_1$ indicates that once a user performs interaction $106_1$ on object $104_1$, the UI prototype transitions from screen $102_1$ to screen $102_2$ after a user performs an action on object $104_1$. A flow may have any number of interactions, and each object and screen may have multiple, or no, interactions. So for example, flow $122_1$ has interaction $106_1$ to interaction $106_N$ each defining actions or interactions a user may have with the screens resulting in transitions to new screens, animations, or the like. Examples of such interactions may comprise clicks, double-slicks, hovering, right click, tap, double tap, press and hold, swipes, or the like.

Figure 2:
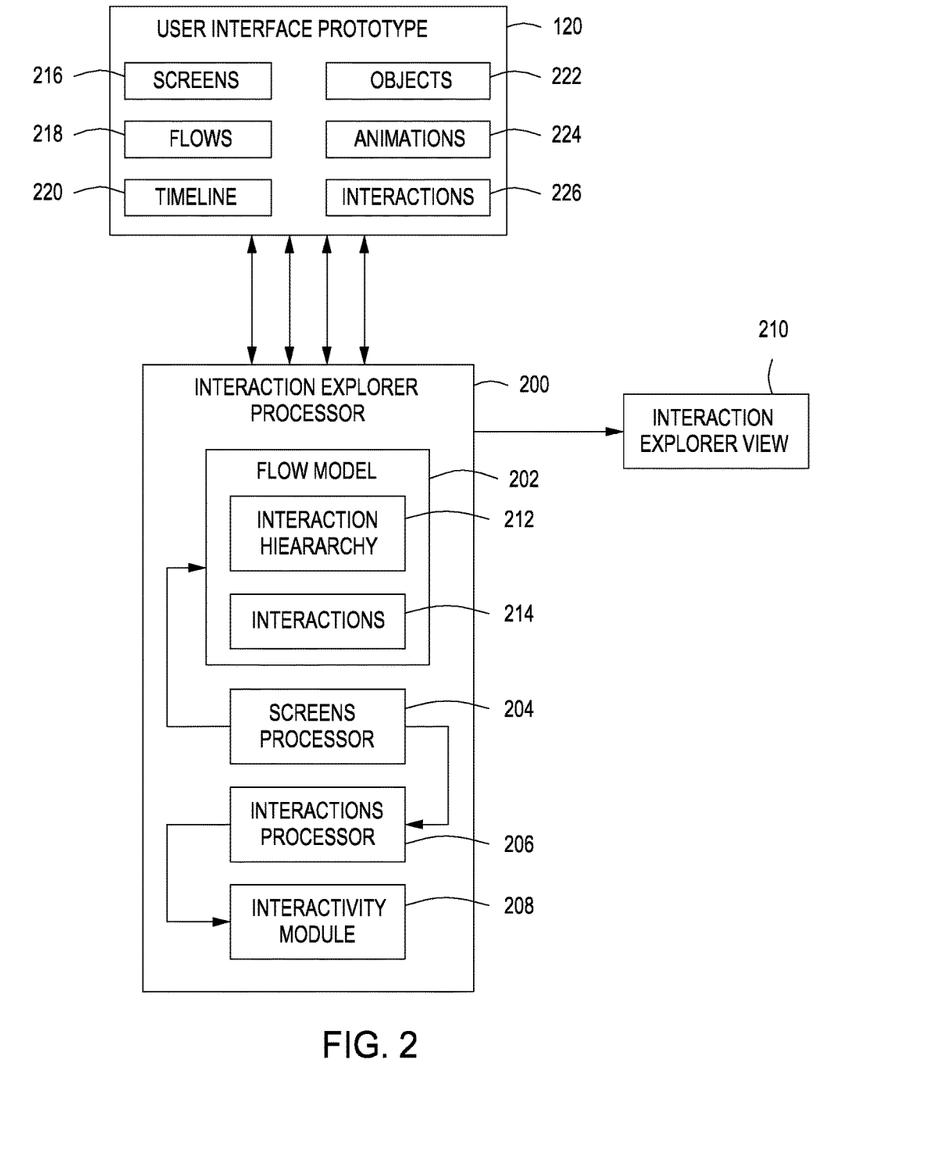
FIG. 2 depicts a block diagram of an interaction explorer processor in accordance with exemplary embodiments of the present invention.

FIG. 2 depicts a block diagram of the interaction explorer processor (IEP) 200 in accordance with exemplary embodiments of the present invention. As the user creates each screen, object and interaction in flow $122_1$ the prototyping engine 100 shown in FIG. 1 generates a corresponding message so that a timeline is created for each action and coupled to the IEP 200. The user interface prototype 120 may send information regarding the screens 216, flows 218, timeline 220, objects 222, animations 224 and interactions 226 to the IEP 200.

The IEP 200 generates an interactive visual depiction of the UI prototype 120, as the UI prototype 120 is being created. At each step in the creation process of UI prototype 120, new screens 216, new objects 222, new animations 224 and new interactions 226 are transmitted to the IEP 200 to update the interactive visual depiction of the UI prototype 120.

According to one embodiment, as the UI prototype 120 is being created, the IEP 200 initially generates a flow model 202 comprising an interaction hierarchy 212, composed of interactions 214. The interaction hierarchy 212 comprises the branches of the UI prototype 120 created by each of the interactions 214. The flow model 202 is an internal structure and may be implemented in many different ways, known to those of ordinary skill in the art. For example, the flow model 202 may take the form of a tree, several linked lists, or the like.

Figure 6:
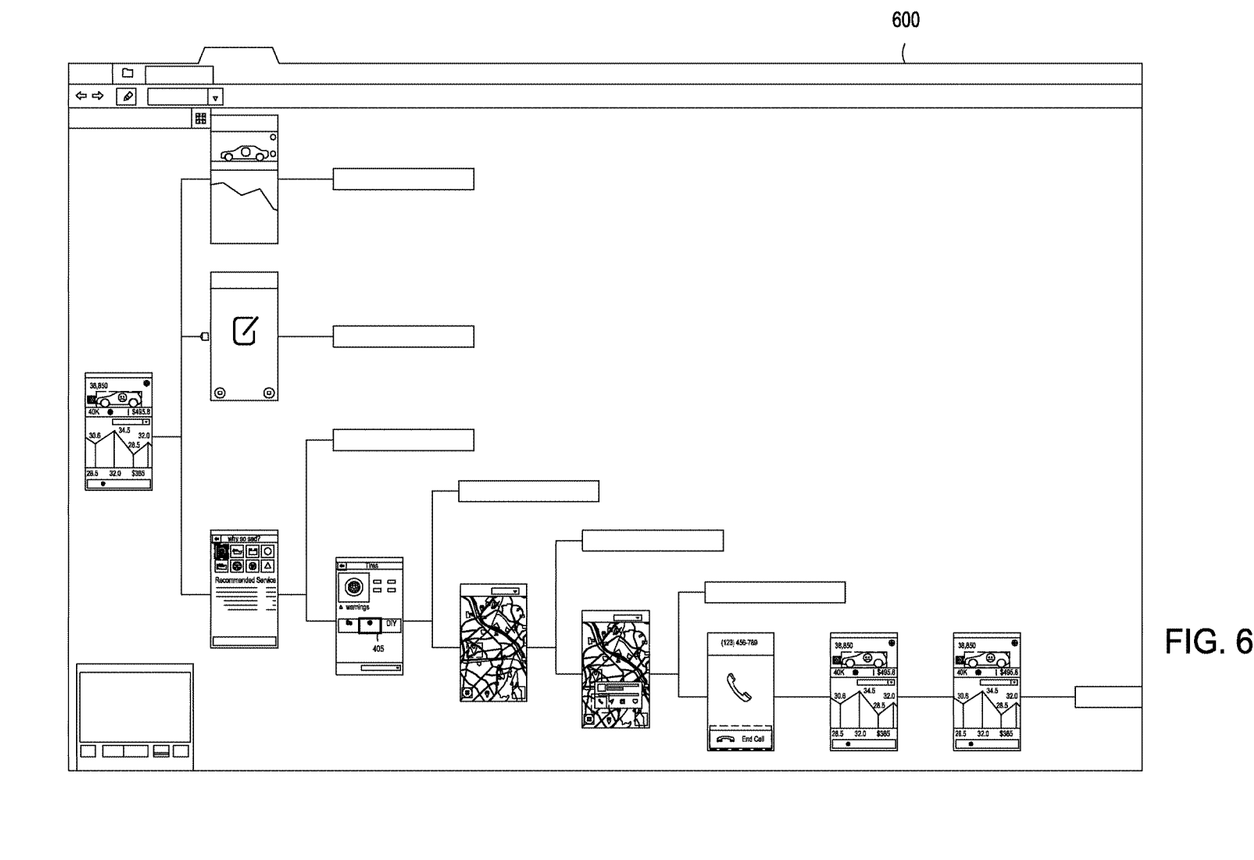
FIG. 6 illustrates an example view of the interactions explorer in accordance with exemplary embodiments of the present invention.

As the user adds new screens to screens 216 in the UI prototype 120, the screens processor 204 processes each screen. The processing of each new screen comprises iterating through each object in each screen and inserting representational information about each screen and object into the flow model 202. If an interaction is encountered, the screen processor 204 invokes the interactions processor 206. The interactions processor 206 analyzes the information regarding the interaction, for example, the object to which the interaction is attached, the action which executes the interaction (e.g., a click on an object or the like), the screen that is displayed as a result of the interaction, and the like. The interactions processor 206 stores information associated with the interaction in the flow model 202 as interactions 214. The interactivity module 208 follows each interaction as the interactions are added to the UI prototype 120 and updates the interaction explorer view 210. The interaction explorer view 210 is the current view of all branches that a user can follow through the UI prototype 120. An example of an interaction explorer view 210 is shown in FIG. 6 and discussed below.

Figure 3:
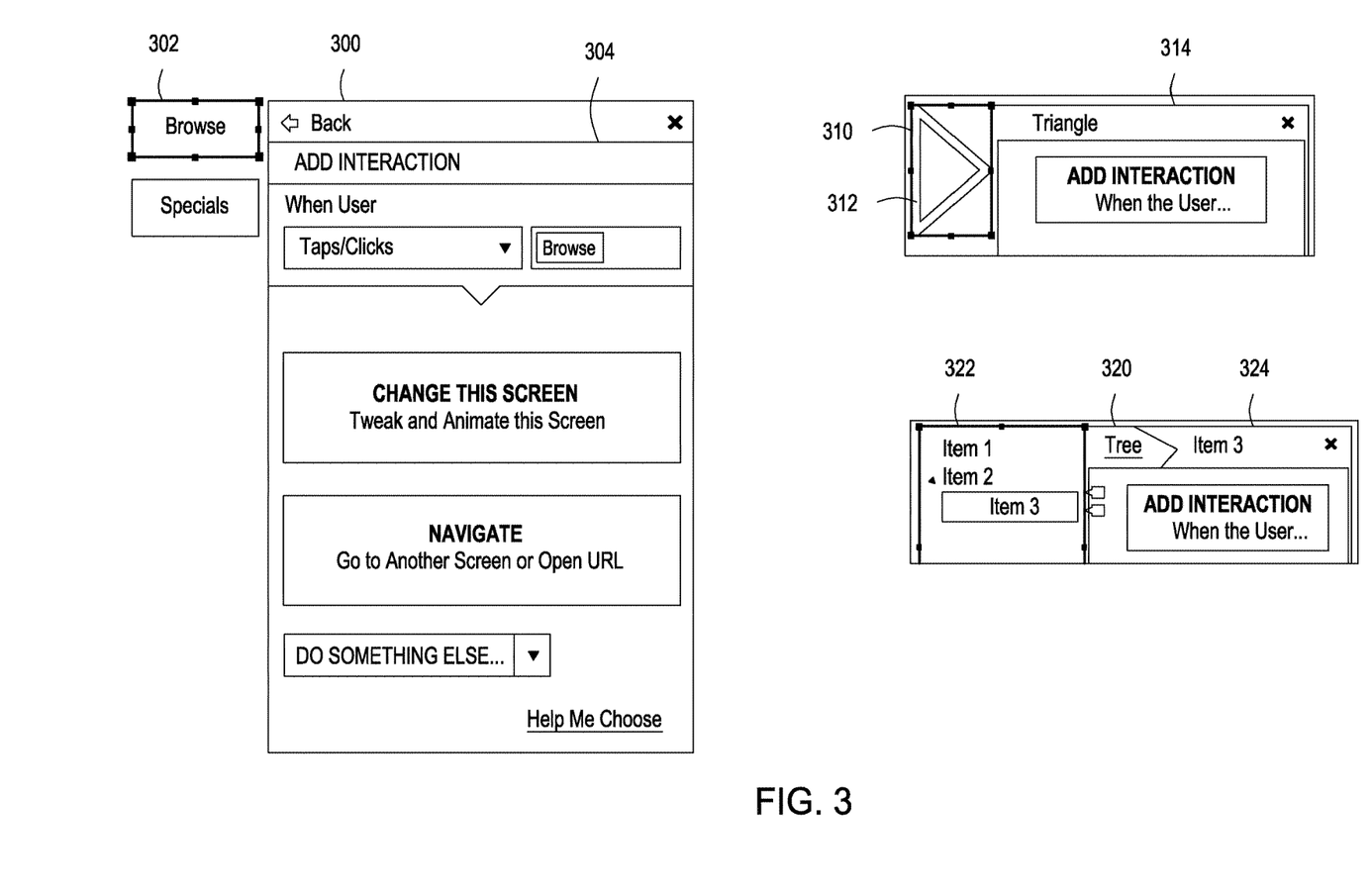
FIG. 3 illustrates a screen and interactions of a user interface prototype in accordance with exemplary embodiments of the present invention.

FIG. 3 illustrates a screen and interactions of a user interface prototype in accordance with exemplary embodiments of the present invention. A designer creates screen 300, for example, and adds several buttons on the screen 300. One button is the "Browse" button 302. When a designer performs a configuration action on the button 302, for example, selecting button 302, the "ADD INTERACTION" screen is displayed to the designer. The designer can then add an "interaction" based on desired flow. For example, the designer can indicate, as shown, that when the UI prototype is executing, a user can "tap/click" the "Browse" button, a screen change, or navigation to a URL or another screen occurs. Additional actions are also available, for example, hovering over the browse button, holding down the button, or the like.

Similarly, screen 310 displays a triangle shape 312. From screen 310, it is s shown that any object can be assigned an interaction. Once a designer adds an interaction screen via the interaction menu 314, an action performed on the triangle shape 312 initiates the specified interaction. Similarly, screen 320 illustrates a tree list 322 and a menu 324 used to add an interaction to the tree list 322.

Figure 4:
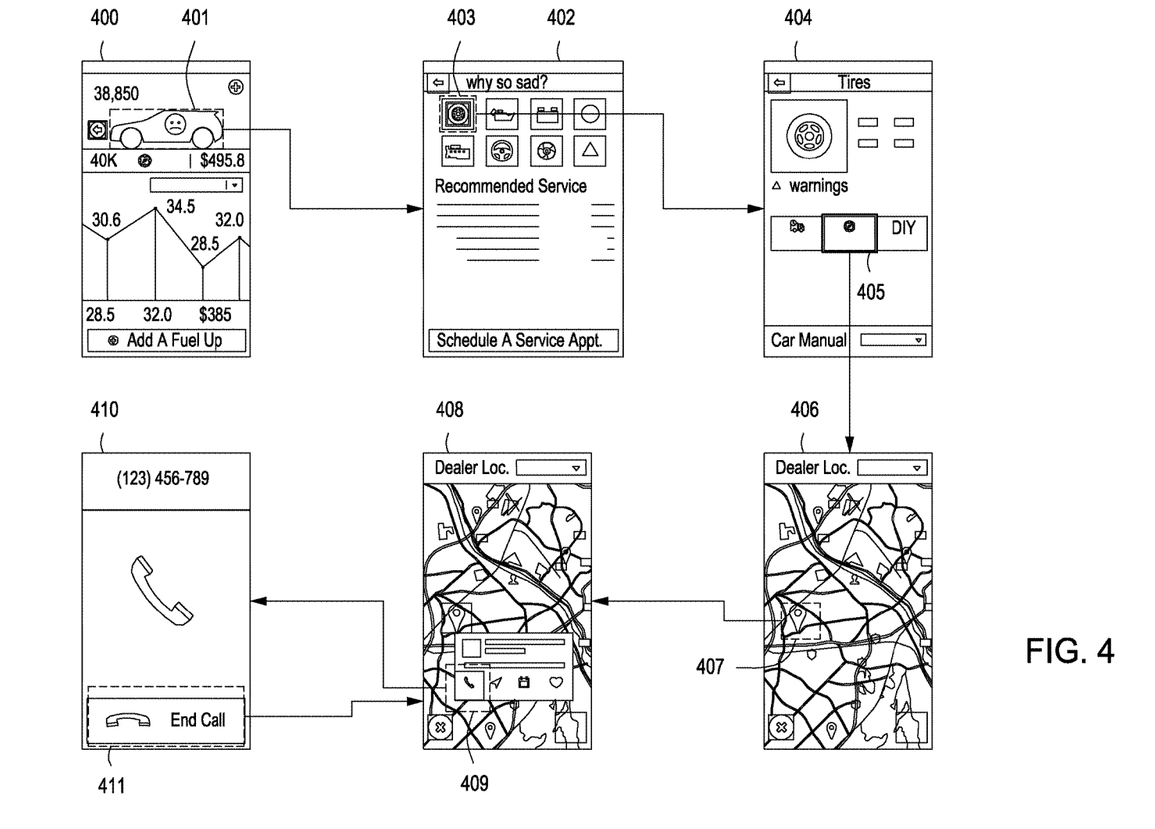
FIG. 4 illustrates a sequence of screens and interactions as a portion of a user interface prototype in accordance with exemplary embodiments of the present invention.

FIG. 4 illustrates a sequence of screens and interactions as a portion of a user interface prototype in accordance with exemplary embodiments of the present invention. The UI prototype contains at least screens 400 to 410. The example UI prototype shown is a fuel application intended for use on a mobile smartphone or tablet device. A user would begin by launching the prototype. Screen 440 is displayed to the user. The user is shown that the there is an issue with their automobile, shown by the "sad" face on the automobile. If the user performs a predefined action, such as clicking on the automobile 401, an interaction is invoked. The interaction causes screen 402 to be displayed. In screen 402, the prototype displays why a "sad" face is shown along with recommended services for the automobile. Additional local specials may be shown as well.

When a user performs an action on object 403, displaying a tire icon, the prototype flows to screen 404, where tire pressure is shown for all four tires. Additional metadata and tire information may also be shown. In this flow, a user may want to locate a dealer to service the tires. A locate dealer button 405 can be activated by the user to transition to screen 406. Screen 406 displays a map of the location of the dealer as well as the user's location. Performing an action on the dealer's location 407 causes the prototype to transition to screen 408. In screen 408, the dealer information is displayed, and a call button 409 is shown. If the user clicks/taps on button 409, the dialer application is launched in screen 410. Finally, in screen 410, the end call button 411 returns the user to screen 408. Those of ordinary skill in the art will recognize that additional interactions may be implemented in a user prototype and those shown are merely exemplary.

Figure 5:
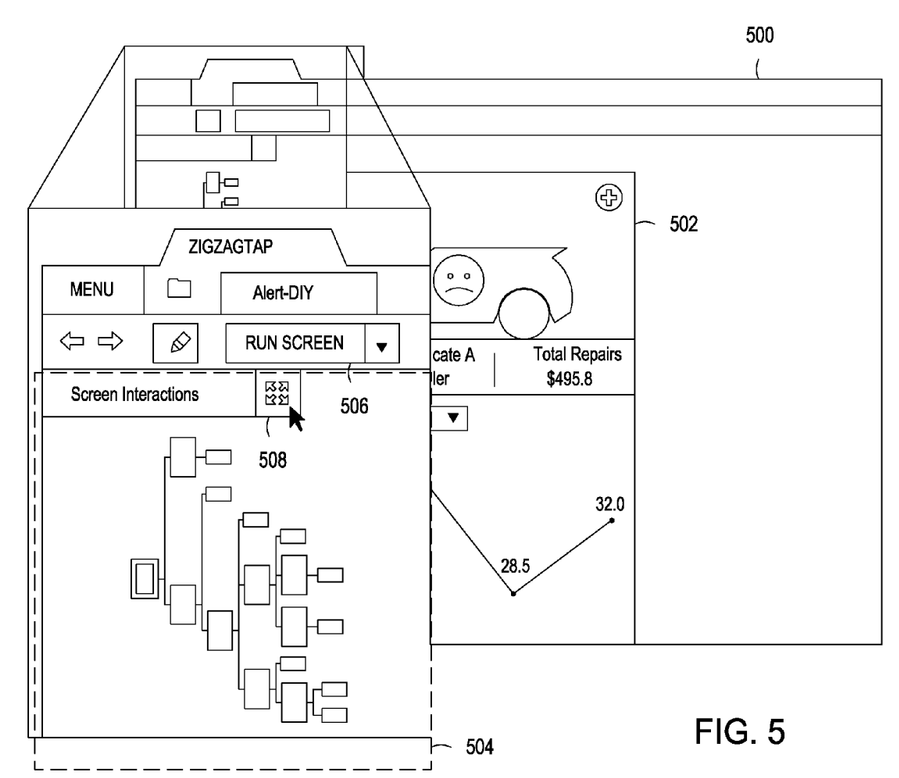
FIG. 5 illustrates editing a screen and displaying a miniature interactions explorer in accordance with exemplary embodiments of the present invention.

FIG. 5 illustrates editing a screen and displaying a miniature interactions explorer 504 in accordance with exemplary embodiments of the present invention. A designer can create and editing various screens in a user prototype in the window 500. Screen 502 is shown being edited by a designer in window 500 displaying the fuel application illustrated in FIG. 4. Button 506 in the window 500 executes the UI prototype so a designer can "walk through" the sample application to get a feel of the flow of each button, interaction and the like.

The window 500 also displays a miniature interactions explorer (MIE) 504, which is generated and updated by the IEP 200 of FIG. 2. The MIE 504 is a reduced scaled representation of the interaction explorer shown in FIG. 6 below. The MIE 504 is a convenient way to show the current flow being edited by the designer within the larger context of the UI prototype. The button 508 expands the MIE 504 to show the full interaction explorer 600 illustrated in FIG. 6. The interaction explorer in FIG. 6 shows all screens, flows and interactions of the UI prototype, illustrated from left to right. Those of ordinary skill in the art will recognize that the interaction explorer 600 may be oriented to designer preference from right to left, top to bottom, or some other orientation desired by the designer. A designer can easily grasp the way an application may flow by viewing the interaction explorer 600. Additionally, designers can select a screen shown in the interaction explorer to directly modify the screen, objects, or its interactions.

If an interaction is changed to transition from one screen to a different screen, the IEP 200 will automatically reconfigure the interaction explorer 600 to reflect that change. The interaction explorer 600 may also highlight the current screen a designer is editing or creating. Interactions which result in the display of a screen which is already shown in the interaction explorer 600 display a small label of the screen so as to avoid duplicate screen representations. The use of labels allows for a fairly compact view of the entire UI prototype without sacrificing complexity and completeness for ease of navigation. The interaction explorer 600 may be generated on the designer's local machine, or transmitted remotely from a server or service and displayed on the designers screen. Additionally, designers can export the interaction explorer 600 to generate a "storyboard" showing all the various flows a user would take in the UI prototype. The storyboard may take the form of a PDF listing of each screen, its interaction-linked screens, and the like, or may be exported as an image file.

Figure 7:
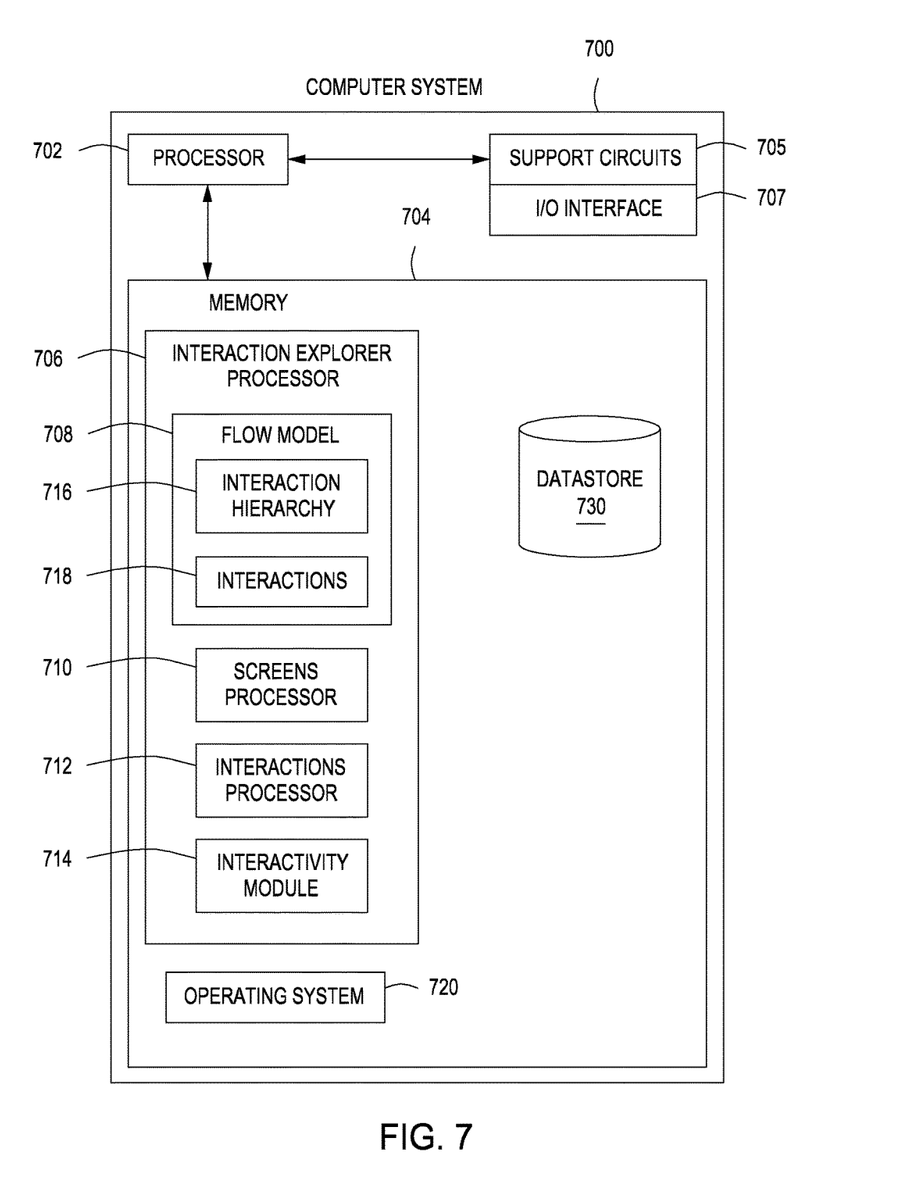
FIG. 7 is a block diagram depicting a computer system for implementing the interactions explorer processor of FIG. 2 in accordance with exemplary embodiments of the present invention.

FIG. 7 is a block diagram depicting a computer system 700 for implementing the interactions explorer processor of FIG. 2 in accordance with exemplary embodiments of the present invention. The computer system 700 includes a processor 702, various support circuits 705, and memory 704. The processors 702 may include one or more microprocessors known in the art. The support circuits 705 for the processor 702 include conventional cache, power supplies, clock circuits, data registers, I/O interface 707, and the like. The I/O interface 707 may be directly coupled to the memory 704 or coupled through the support circuits 705. The I/O interface 707 may also be configured for communication with input devices and/or output devices such as network devices, various storage devices, mouse, keyboard, display, video and audio sensors and the like.

The memory 704, or computer readable medium, stores non-transient processor-executable instructions and/or data that may be executed by and/or used by the processor 702. These processor-executable instructions may comprise firmware, software, and the like, or some combination thereof. Modules having processor-executable instructions that are stored in the memory 704 comprise an interaction explorer processor (IEP) 706. The IEP 706 further comprises a flow model 708, a screens processor 710, an interactions processor 712 and an interactivity module 714. The flow model 708 further comprises an interaction hierarchy 716 and interactions 718. The memory 704 may further comprise a datastore 730.

The computer system 700 may be programmed with one or more operating systems 720, which may include OS/2, Linux, SOLARIS, UNIX, HPUX, AIX, WINDOWS, IOS, and ANDROID among other known platforms. The memory 704 may include one or more of the following: random access memory, read only memory, magneto-resistive read/write memory, optical read/write memory, cache memory, magnetic read/write memory, and the like, as well as signal-bearing media as described below.

Those skilled in the art will appreciate that computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Figure 8:
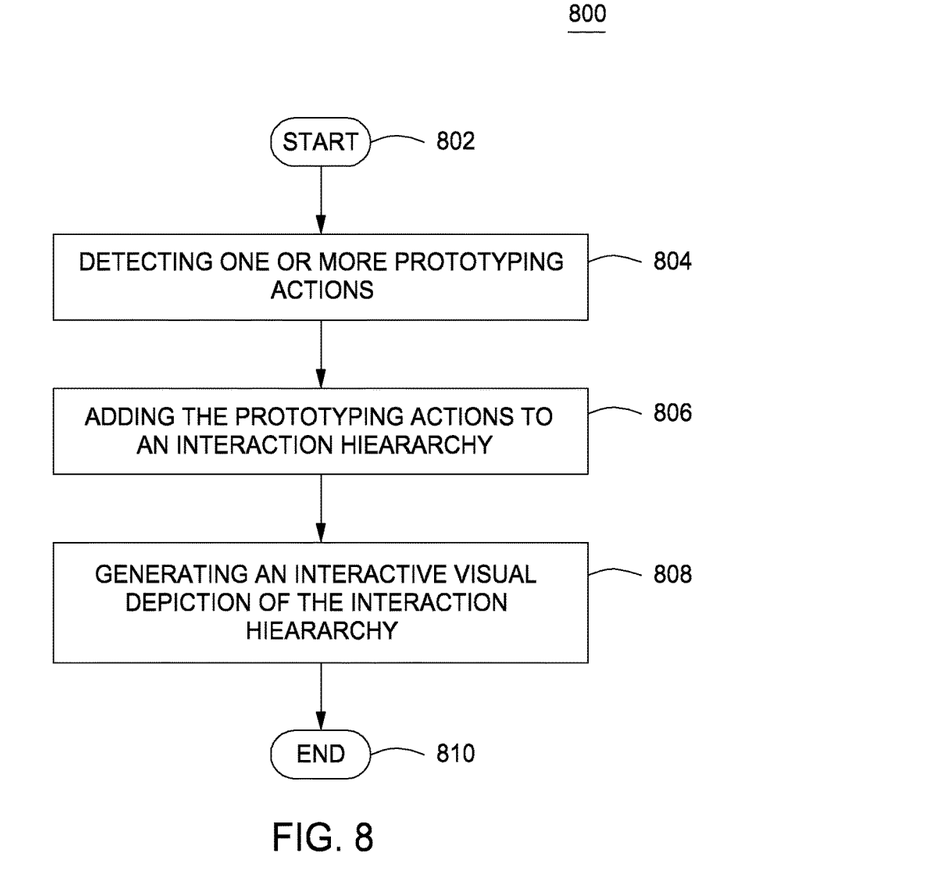
FIG. 8 is a flow diagram illustrating a method for generating an interactive interactions explorer for a user interface prototype in accordance with exemplary embodiments of the present invention.

FIG. 8 is a flow diagram illustrating a method 800 for generating an interaction explorer for a UI prototype in accordance with exemplary embodiments of the present invention. Method 800 illustrates an exemplary flow of the interaction explorer processor 706 stored in memory 704 and executed via the processor 702 of computer system 700. The computer system 700 is an exemplary implementation of the IEP 200 shown in FIG. 2.

The method begins at step 802 and proceeds to step 804. At step 804, one or more prototyping actions are detected by the interaction explorer processor 706. These actions may include creating a screen of a user interface prototype, editing an existing screen of the UI prototype, adding or modifying an object on the screen such as a button, list, tree, shape, label, image or the like. These actions may further comprise attaching an interaction to one or more of the objects to add interactivity to the UI prototype. The method then proceeds to step 806, where the prototyping actions are added to an interaction hierarchy. For example, if the user adds a button to the screen, the button is added to the flow model 708, and specifically in the interaction hierarchy 716, which maintains the hierarchy of screens and objects associated with those screens. Similarly, an interaction that is created is added as interactions 718 in the flow model 708. Finally, at step 808, an interactive visual depiction of the interaction hierarchy (i.e., the interaction explorer view 210 of FIG. 2) is generated by the interaction explorer processor 706. The method terminates at step 810.

While the foregoing is directed to embodiments of the present invention, other and further embodiments of the invention may be devised without departing from the basic scope thereof, and the scope thereof is determined by the claims that follow.

The invention claimed is:

1. A method for generating an interactions explorer for a user interface prototype comprising:
   defining and displaying on a display, for a user interface (UI) in a user interface prototype, a screen flow comprising one or more screens, the flow representing branches in the UI prototype;
   detecting one or more prototyping actions while a user creates the user interface prototype, wherein the one or more prototyping actions are related to screen flow in the user interface prototype;
   adding the one or more prototyping actions to an interaction hierarchy that outlines the screen flow of the prototype;
   automatically generating and displaying, in a portion of the display, in response to adding the one or more prototyping actions to the interaction hierarchy, an interactive visual depiction of the interaction hierarchy;
   generating, in the interactive visual depiction, a flow for each path through the user interface prototype, the flow comprising one or more screens coupled via one or more interactions;
   detecting selection of a screen from the one or more screens;
   allowing a user to edit the selected screen of the user interface prototype;
   generating a new interactive visual depiction based on the editing; and
   propagating changes made in editing the selected screen to screens which flow from the selected screen via one or more interactions.

2. A method for generating an interactions explorer for a user interface prototype comprising:
   defining and displaying on a display, for a user interface (UI) in a user interface prototype, a screen flow comprising one or more screens, the flow representing branches in the UI prototype;

detecting one or more prototyping actions while a user creates the user interface prototype, wherein the one or more prototyping actions are related to screen flow in the user interface prototype;

adding the one or more prototyping actions to an interaction hierarchy that outlines the screen flow of the prototype;

automatically generating and displaying, in a portion of the display, in response to adding the one or more prototyping actions to the interaction hierarchy, an interactive visual depiction of the interaction hierarchy; and arranging screens in the interactive visual depiction depending on their time of creation.

3. An apparatus for generating an interactions explorer for non-linear flows comprising a processor for executing software instructions comprising:

defining and displaying on a display, for a user interface in a user interface prototype, a screen flow comprising one or more screens, the flow representing branches in the UI prototype;

detecting one or more prototyping actions while a user creates the user interface prototype, wherein the one or more prototyping actions are related to screen flow in the user interface prototype;

adding the one or more prototyping actions to an interaction hierarchy that outlines the screen flow of the prototype;

automatically generating and displaying in a portion of the display, in response to adding the one or more prototyping actions to the interaction hierarchy, an interactive visual depiction of the interaction hierarchy;

generating, in the interactive visual depiction, a flow for each path through the user interface prototype, the flow comprising one or more screens coupled via one or more interactions;

detecting selection of a screen from the one or more screens;

allowing a user to edit the selected screen of the user interface prototype;

generating a new interactive visual depiction based on the editing; and propagating changes made in editing the selected screen to screens which flow from the selected screen via one or more interactions.

* * * * *